(12) United States Patent
Ishikawa et al.

(10) Patent No.: US 6,203,464 B1
(45) Date of Patent: Mar. 20, 2001

(54) SUPPORT STRUCTURE FOR ROTATION SPEED SENSORS

(75) Inventors: Kazuo Ishikawa; Hideaki Shima, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/170,927

(22) Filed: Oct. 13, 1998

(30) Foreign Application Priority Data

Oct. 14, 1997 (JP) .................................................. 9-280493

(51) Int. Cl.⁷ .................................................. F16H 48/00
(52) U.S. Cl. ............................................ 475/150; 475/230
(58) Field of Search .................... 475/149, 150, 475/230

(56) References Cited

U.S. PATENT DOCUMENTS

| | | | | |
|---|---|---|---|---|
| 1,987,716 | * | 1/1935 | Skelton | 475/230 |
| 2,786,367 | * | 3/1957 | Rockwell | 475/230 |
| 3,769,533 | * | 10/1973 | Pauwels | 188/181 R |
| 3,845,671 | | 11/1974 | Sharp et al. | 74/710.5 |
| 4,263,824 | * | 4/1981 | Mueller | 74/711 |
| 4,363,248 | * | 12/1982 | Brisabois | 475/230 |
| 4,683,775 | | 8/1987 | Hilker et al. . | |
| 4,724,935 | * | 2/1988 | Roper et al. | 188/181 R |
| 4,947,325 | | 8/1990 | Iwata et al. . | |
| 4,953,670 | * | 9/1990 | Chemelewski | 475/150 X |
| 5,073,159 | * | 12/1991 | Kurachi | 475/200 X |
| 5,157,966 | | 10/1992 | Lugosi et al. . | |
| 5,335,764 | * | 8/1994 | Leitner et al. | 192/85 C |
| 5,486,757 | * | 1/1996 | Easley | 475/150 X |
| 5,836,846 | * | 11/1998 | Hewko et al. | 475/149 |

FOREIGN PATENT DOCUMENTS

| | | |
|---|---|---|
| 0 263 236 A2 | 4/1988 | (EP) . |
| 0 443 937 A1 | 8/1991 | (EP) . |
| 3-227726 | * 10/1991 | (JP) . |
| 9-315125 | 12/1997 | (JP) . |

* cited by examiner

Primary Examiner—Charles A Marmor
Assistant Examiner—Ha Ho
(74) Attorney, Agent, or Firm—Morgan & Finnegan, L.L.P.

(57) ABSTRACT

A differential apparatus includes a ring gear and a sensor for detecting the rotation speed of the ring gear. One side of the ring gear has a plurality of teeth. The sensor detects the teeth passing by the sensor when the ring gear rotates. Each tooth has an outer end surface that is parallel to the rotation axis of the ring gear. The sensor is spaced from the gear and radially faces the axis of the gear.

18 Claims, 3 Drawing Sheets

SUPPORT STRUCTURE FOR ROTATION SPEED SENSORS

BACKGROUND OF THE INVENTION

The present invention relates to a support structure of sensors for detecting the number of rotation of a bevel gear. More specifically, the present invention relates to a sensor support structure for detecting the number of the rotation of a ring gear of a differential apparatus provided in vehicles, based on detecting the teeth of the ring gear.

FIG. 3 shows part of a prior art differential apparatus 20. As shown in the figure, the differential apparatus 20 has an outer case 23 and an inner case 27. The inner case 27 is rotatably supported in the outer case 23. A ring gear 21, which is a bevel gear, is fixed to the inner case 27. The ring gear 21 is meshed with a drive pinion (not shown) fixed to the distal end of a drive shaft (not shown). When the drive shaft rotates, the ring gear 21 rotates with the inner case 27. The rotation of the ring gear 21 is transferred to right and left axles 30 (only one is shown) by differential gears 28, 29 in the inner case 27.

A magnetic sensor 22 is installed in the differential apparatus 20 to detect the rotation speed of the ring gear 21. The magnetic sensor 22 is inserted in an installation hole 24 provided in the outer case 23. The magnetic sensor 22 is fixed to the outer case 23, with a positioning flange 22a in contact with a positioning surface 24a of the hole 24.

The magnetic sensor 22 includes a detection surface 25 facing the edge 26a of each tooth 26 of the ring gear 21. When the ring gear 21 rotates, the magnetic sensor 22 detects the teeth that pass by the detection surface 25. Accordingly, the rotation speed of the ring gear 21 is obtained based on the detected number of the teeth 26 per unit time. The speed of the ring gear 21 may be used to determine the vehicle speed.

The magnetic sensor 22 includes a magnet and a magnetic detection element such as an electromagnetic pickup coil, a hall element, and a magnetic resistance element. The magnetic flux from the magnet extends through the detection surface, and a magnetic path is formed between the detection surface 25 and the ring gear 21. The ring gear 21 forms a part of the magnetic path. When the teeth 26 pass by the detection surface 25 with the rotation of the ring gear 21, the magnetic resistance and the magnetic flux of the magnetic path between the detection surface 25 and the ring gear 21 change. The magnetic detection element outputs signals in accordance with the change of the magnetic flux. Accordingly, the teeth 26, which pass by the detection surface, are detected based on the signals.

The sensitivity of the magnetic sensor 22 is greatly influenced by the space between the tooth edge 26a and the detection surface 25. Accordingly, the magnetic sensor 22 is installed in the outer case 23 with the detection surface 25 as near as possible to the tooth edge 26a, taking into consideration the error of measurement of the teeth edges and the error of the installation position of the magnetic sensor 22 in the axial direction.

During assembly of the differential apparatus 20, the position of the inner case 27 in the axial direction is set to adjust the backlash between the ring gear 21 and the drive pinion. When the axial position of the inner case 27 changes, the space between the detection surface 25 of the magnetic sensor and the tooth edge 26a of the ring gear 21 changes. Since the position of the inner case 27 is adjusted in each individual differential apparatus 20, the space between the detection surface 25 and the tooth edge 26a differs from one differential apparatus 20 to another. Accordingly, the sensitivity of the magnetic sensor 22 differs in each differential apparatus 20. Also, when the space between the detection surface 25 and the tooth edge 26a is too large, the magnetic sensor 22 will not be able to detect gear teeth.

Thus, to keep the space between the detection surface and the tooth edge 26a constant, it was necessary to adjust the assembly position of the magnetic sensor 22 in the axial direction, for example, by arranging a shim (not shown) between the positioning flange 22a and the positioning surface 24a of the hole 24. This complicates the installation of the magnetic sensor 22. Even if the differential apparatus 20 assembled in this way is installed in a vehicle, the axial position of the inner case 27 can change when the rotation direction of the drive shaft is changed. Therefore, fluctuation of the sensitivity of the magnetic sensor 22 was not completely prevented by using a shim.

SUMMARY OF THE INVENTION

The present invention is designed to solve the above problem. The objective of the invention is to provide a support structure for a sensor that maintains a constant minimum space between the teeth of a bevel gear used for a differential apparatus and the sensor for detecting the rotation speed of the bevel gear.

To achieve the above objective, the present invention provides an apparatus including a bevel gear and a sensor for detecting the rotation speed of the bevel gear. One side of the bevel gear has a plurality of teeth. Each tooth has an outer end surface that is parallel to the rotation axis of the bevel gear. The sensor is spaced from the gear and radially faces the axis of the gear. The sensor detects at least one of the teeth passing by the sensor when the bevel gear rotates.

The present invention further provide a differential apparatus for vehicles. The differential apparatus includes an outer case, an inner case rotatably supported in the outer case, and a ring gear fixed to the inner case. One side of the ring gear includes a plurality of teeth. Each tooth has an outer end surface that defines a cylinder, which is coaxial to the bevel gear. A drive pinion is rotatably supported in the outer case to mesh with the ring gear. The axial position of the inner case is adjustable to adjust the backlash between the ring gear and the drive pinion. A sensor is installed in the outer case to face the periphery of the ring gear, wherein the sensor detects at least one of the teeth passing by the sensor.

The present invention further provides a bevel gear having a plurality of teeth. Each tooth includes an outer end surface that defines a cylinder that is coaxial to the bevel gear.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention will now be described in reference to FIGS. 1 and 2.

Figure 2:
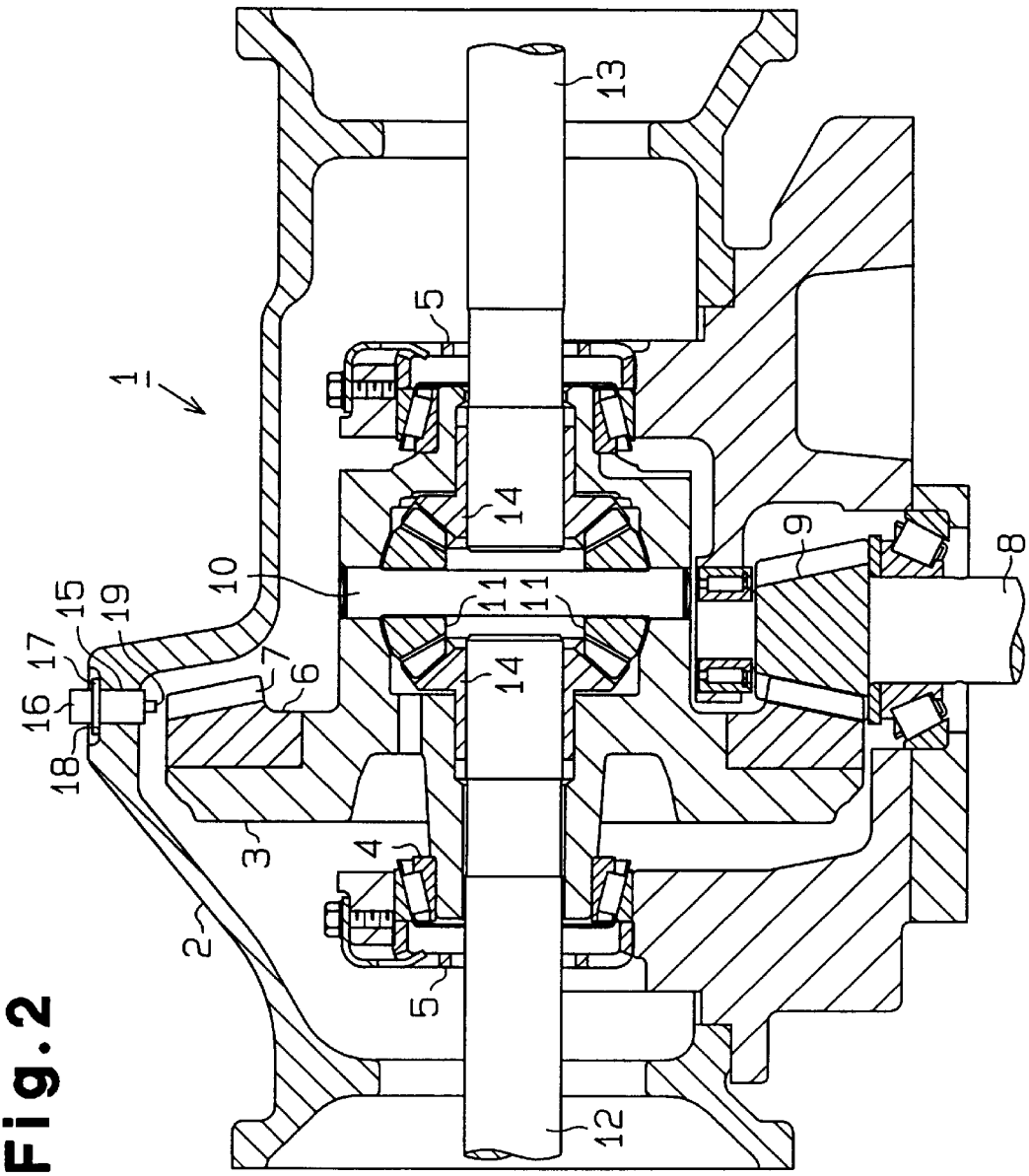
FIG. 2 is a cross-sectional view showing the whole differential apparatus.
Figure 3:
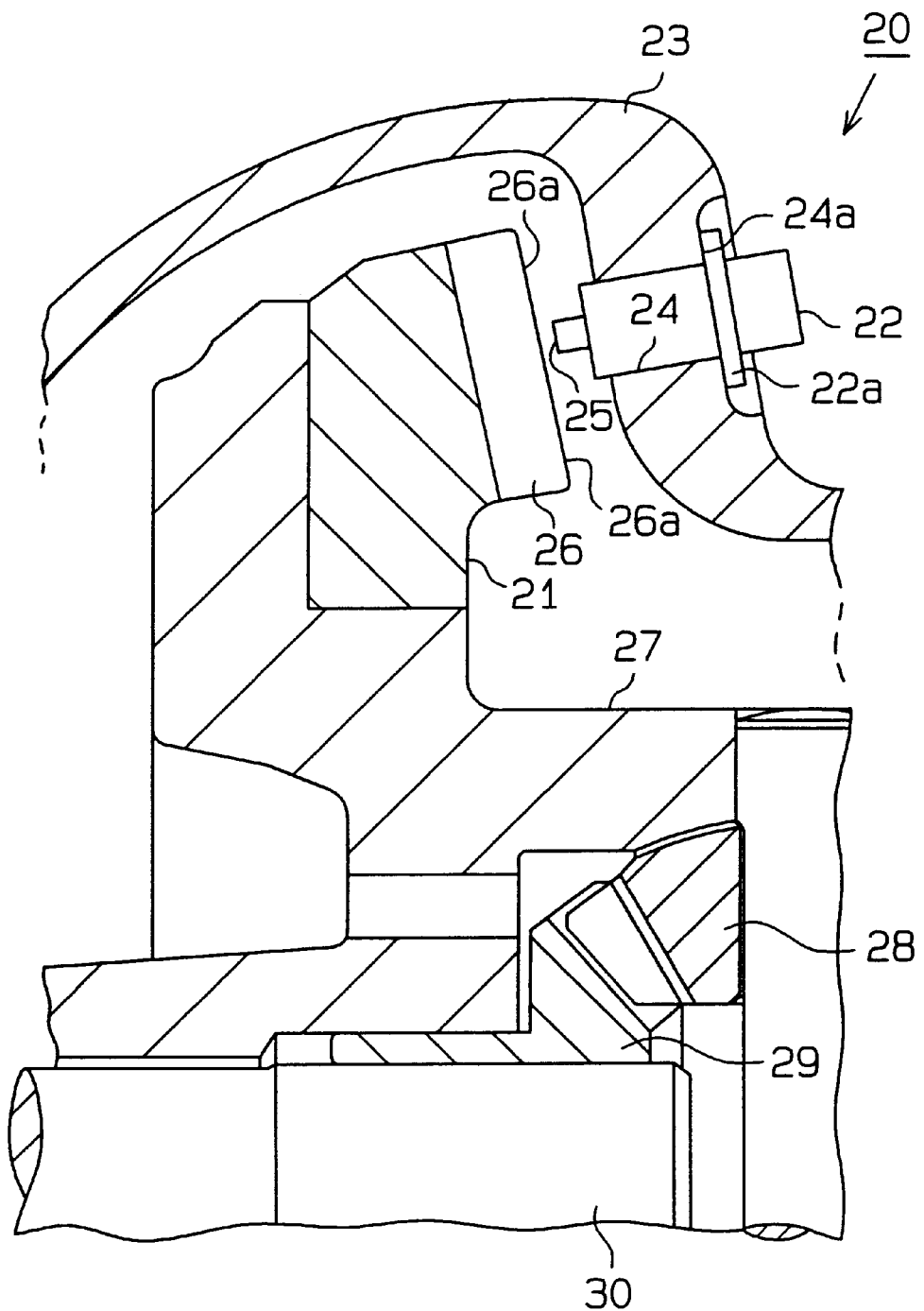
FIG. 3 is a partial sectional view showing a prior art support structure for a magnetic sensor on a differential apparatus.

FIG. 2 is a cross sectional view showing a differential apparatus 1 coupled to a front axle of a forklift. Within the outer case 2 of the differential apparatus 1, an inner case 3 is rotatably supported by a pair of tapered bearings 4. An adjustment nut 5 is provided outside each tapered bearing 4. The adjustment nuts 5 are used to adjust the axial position of the inner case 3 with respect to the outer case 2.

A ring gear 6 is fixed to the inner case 3. The ring gear 6, which is a bevel gear, or more specifically, a hypoid gear, includes a plurality of teeth 7 on its side. As shown in FIGS. 1 and 2, the peripheral surface of the ring gear 6 defines a cylinder, which is coaxial to the gear 6. Each tooth 7 has an outer end surface 7a that forms a part of the peripheral surface of the ring gear 6. In other words, the outer end surface 7a of each tooth 7 is parallel to the axis of the ring gear 6.

As shown in FIG. 2, the distal end of a drive shaft 8, which extends from a transmission (not shown), is rotatably supported in the outer case 2. A drive pinion 9 is fixed to the distal end of the drive shaft 8. The drive pinion 9 is meshed with the ring gear 6. The backlash between the ring gear 6 and the drive pinion 9 is adjusted by adjusting the axial position of the inner case 3 with the adjustment nuts 5.

A shaft 10 is fixed to the inner case 3 to cross the axis of the inner case 3 at a right angle. A pair of first differential gears 11 are rotatably supported on opposite ends of the shaft 10. The inner ends of a right drive axle 12 and a left drive axle 13 extend into the inner case 3. Second differential gears 14, which are fixed to the inner ends of the axles 12, 13, respectively, are meshed with the first differential gears 11.

Figure 1:
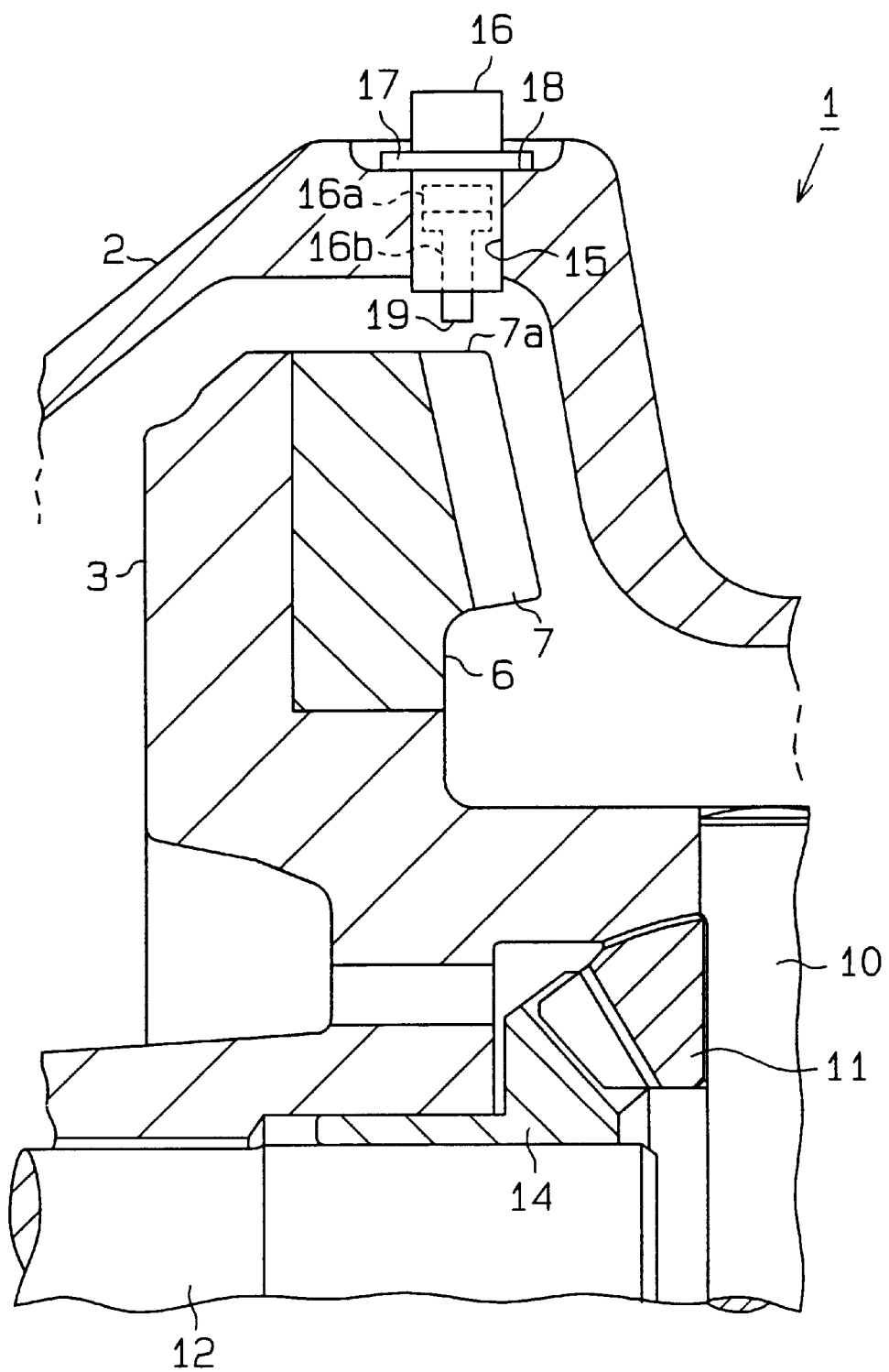
FIG. 1 is a partial enlarged sectional view showing a support structure for a magnetic sensor on a differential apparatus according to a first embodiment.

As shown in FIG. 1, the outer case 2 has an installation hole 15, the axis of which is radial with respect to the gear 6, at a side of the outer case 2 that is opposite from the drive shaft 8. A magnetic sensor 16 for detecting the rotation speed of the ring gear 6 is installed in the hole 15. The magnetic sensor 16 has a positioning flange 17. The axial position of the magnetic sensor 16 is fixed by the flange 17, which contacts a positioning surface 18 outside the hole 15. When installed, a detection surface 19 of the magnetic sensor 16 faces the outer surface of the gear 6 across a predetermined space. In other words, the magnetic sensor 16 is spaced from the gear 6 by a predetermined minimum distance and is radially aligned with the outer surface 7a of each tooth at various times.

The magnetic sensor 16 includes a magnet 16a and a magnetic detection element 16b. The magnetic detection element 16b is, for example, an electromagnetic pick-up coil, magnetic resistance element, or hall element. The magnetic flux from the magnet 16a extends through the detection surface 19, and a magnetic path is formed between the detection surface 19 and the ring gear 6. The ring gear 6 forms a part of the magnetic path. When a tooth 7 passes by the detection surface 19 with the rotation of the ring gear 6, the magnetic resistance and flux of the magnetic path changes. More specifically, the magnetic resistance is smaller when a tooth 7 is directly opposed to the detection surface 19 than when no tooth 7 is so opposed. Inversely to this, the magnetic flux is greater when a tooth 7 directly opposes the detection surface 19 than when no tooth is so opposed. The magnetic detection element 16b outputs a signal according to the change of the magnetic resistance or the change of magnetic flux. Accordingly, the tooth passing by the detection surface 19 is detected based on the signal.

During assembly of the differential apparatus 1, the axial position of the inner case 3 is adjusted by the adjustment nuts 5 to adjust the backlash between the ring gear 6 and the drive pinion 9. In the present invention, the outer end surfaces 7a of the teeth 7 define the surface of a cylinder, which is coaxial to the ring gear 6. What is more, the detection surface 19 of the magnetic sensor 16 faces the axis of the ring gear 6. Accordingly, even when the axial position of the inner case 3 changes with the adjustment of backlash, the space between the detection surface 19 and the cylinder is always constant, and the sensitivity of the sensor 16 is maintained. In other words, the minimum distance between the outer spaces 7a of the teeth and the detection surface 19 is always constant. This space is the same in all the differential apparatuses 1, and the sensitivity of the sensor 16 in each differential apparatus 1 is the same.

There is no need to use shim for adjusting the installation position of the magnetic sensor 16, because the space between the detection surface 19 and the tooth 7 is kept constant. This facilitates the installation of the sensor 16.

When the differential apparatus 1 is being operated, the axial position of the inner case 3 can fluctuate with the change of the rotation direction of the drive shaft 8. Nevertheless, the space between the detection surface 19 and the tooth 7 of the ring gear 6 is kept constant and the sensitivity of the sensor 16 is kept constant.

Since the minimum space between the detection surface 19 and the gear 6 is kept constant, the detection surface 19 can be located very near the gear 6, while avoiding interference. This improves the sensitivity of the sensor 16.

The present invention is not limited to the above embodiment. It will further be embodied as follows.

Instead of the magnet 16a for generating a flux in the magnetic sensor 16, the teeth 7 of the ring gear 6 may be magnetized. In this case, since the magnetic detection element 16b in the sensor 16 detects the flux from each tooth 7, the sensitivity of the sensor 16 improves compared to when the flux from a magnet 16a in the sensor 16 is detected through the teeth 7. This permits the space between the sensor 16 and the cylinder to be enlarged.

The sensor for detecting the rotation speed of the ring gear 6 is not limited to a magnetic sensor. For example, a high frequency oscillation type proximity switch may be employed. The switch has a high-frequency oscillation coil, which detects the teeth 7 based on the change of impedance accompanying the rotation of the ring gear 6. Or, a differential coil type proximity switch may be employed. This proximity switch has a pair of coils to which an alternating current is applied. The teeth 7 are detected based on the change of the magnetic flux due to an eddy current loss accompanying the rotation of the ring gear. The teeth, as actuators, actuate the sensor as they pass by.

The ring gear 6, which is not limited to a hypoid gear, may be a spiral bevel gear, a straight bevel gear, a skew bevel gear, or a herringbone bevel gear. The ring gear 6 may further be a bevel gear the teeth of which are arranged on a plane normal to the rotation axis, that is, a crown gear.

The present invention may be employed in a differential apparatus located in the rear axle. Further, the present invention may be employed in other types of apparatuses having a bevel gear.

The present invention may be employed in other industrial vehicles such as shovel loaders, and vehicles for high lift work. Further, the present invention may be employed in vehicles other than the industrial vehicles, such as passenger cars and transportation vehicles.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An apparatus comprising a bevel gear and a sensor for detecting the rotation speed of the bevel gear, wherein one side of the bevel gear has a plurality of teeth, wherein each tooth has an outer end surface that is parallel to the rotation axis of the bevel gear, wherein the sensor is spaced from the gear and faces the axis of the gear, and wherein the sensor is radially aligned with and faces each outer end surface of said plurality of teeth, whereby the sensor detects at least one end surface of the teeth passing by the sensor when the bevel gear rotates.

2. The apparatus according to claim 1, wherein the outer end surfaces of the teeth define a cylindrical surface of revolution that is coaxial to the rotation axis of the bevel gear.

3. The apparatus according to claim 1, wherein the sensor includes a magnetic sensor that outputs a signal according to changes in magnetic properties accompanying the passage of the teeth.

4. The apparatus according to claim 3, wherein the sensor includes a magnet generating a magnetic flux and a magnetic detection element that detects the flux from the magnet through the bevel gear.

5. The apparatus according to claim 1, wherein the apparatus is a differential apparatus for a vehicle, the differential apparatus comprising an outer case and an inner case, the inner case being rotatably supported in the outer case, wherein the bevel gear is a ring gear fixed to the inner case, and wherein the sensor is installed in the outer case.

6. The apparatus according to claim 5 further comprising a drive pinion rotatably supported on the outer case to engage the ring gear, wherein the backlash between the ring gear and the drive pinion is adjustable by adjusting the position of the inner case in relation to the drive pinion along the axis of rotation of the ring gear.

7. The apparatus according to claim 5, wherein the outer case includes a through hole, in which the sensor is installed, and a positioning surface around the through hole, and wherein the sensor includes a positioning member that contacts the positioning surface to fix the axial position of the sensor.

8. The apparatus according to claim 5, wherein the vehicle is a forklift.

9. A differential apparatus for vehicles, the differential apparatus comprising:
an outer case;
an inner case rotatably supported in the outer case;
a ring gear having an axis of rotation, the ring gear fixed to the inner case, wherein one side of the ring gear includes a plurality of teeth and each tooth has an outer end surface that defines a cylindrical surface of revolution which is coaxial to the axis of rotation of the ring gear;

a drive pinion rotatably supported in the outer case to mesh with the ring gear, wherein the backlash between the ring gear and the drive pinion is adjustable by adjusting the position of the inner case in relation to the drive pinion along the axis of rotation of the ring gear; and a sensor installed in the outer case to face the axis of the ring gear, wherein the sensor is radially aligned with and faces the outer end surfaces of the teeth, and wherein the sensor detects the end surface of each of the teeth passing by the sensor.

10. The apparatus according to claim 9, wherein the sensor includes a magnetic sensor that outputs a signal according to changes in magnetic properties accompanying passage of the teeth.

11. The apparatus according to claim 10, wherein the sensor includes a magnet generating the magnetic flux and a magnetic detection element detecting the flux from the magnet through the ring gear.

12. The apparatus according to claim 9, wherein the outer case includes a through hole, in which the sensor is installed, and a positioning surface around the through hole, and wherein the sensor includes a positioning member that contacts the positioning surface to fix the axial position of the sensor.

13. The apparatus according to claim 9, wherein the vehicle is a forklift.

14. An apparatus comprising a bevel gear having an axis of rotation and a plurality of teeth, a sensor for detecting the rotation speed of the bevel gear and an actuator means for actuating the sensor, wherein the teeth have outer end surfaces and the bevel gear has a surface of revolution defined by the outer end surfaces of the teeth that is parallel to the axis of rotation of the bevel gear, the actuator means comprising at least one of said outer end surfaces of the teeth, wherein the sensor is spaced from the outer end surfaces of the teeth and faces the axis of rotation of the bevel gear, wherein the sensor is radially aligned with and faces said outer end surfaces of the teeth, and wherein the sensor detects the actuator means as the bevel gear rotates.

15. The apparatus of claim 14, wherein the apparatus is a vehicle differential comprising an outer case and an inner case, the inner case being rotatably supported in the outer case, wherein the bevel gear is a ring gear fixed to the inner case, and wherein the sensor is installed in the outer case.

16. The apparatus of claim 15, further comprising a drive pinion rotatably supported on the outer case, wherein the drive pinion engages the ring gear and the backlash between the ring gear and drive pinion is adjustable by adjusting the position of the inner case in relation to the drive pinion along the axis of rotation of the ring gear.

17. The apparatus of claim 14, wherein the sensor includes a magnetic sensor that outputs a signal according to changes in magnetic properties accompanying the passage of the actuator means, wherein the actuator means comprises the outer end surfaces of the bevel gear teeth.

18. The apparatus of claim 17, wherein the sensor includes a magnet generating a magnetic flux and a magnetic detection element that detects the flux from the magnet through the bevel gear.

* * * * *